United States Patent Office 3,439,539
Patented Apr. 22, 1969

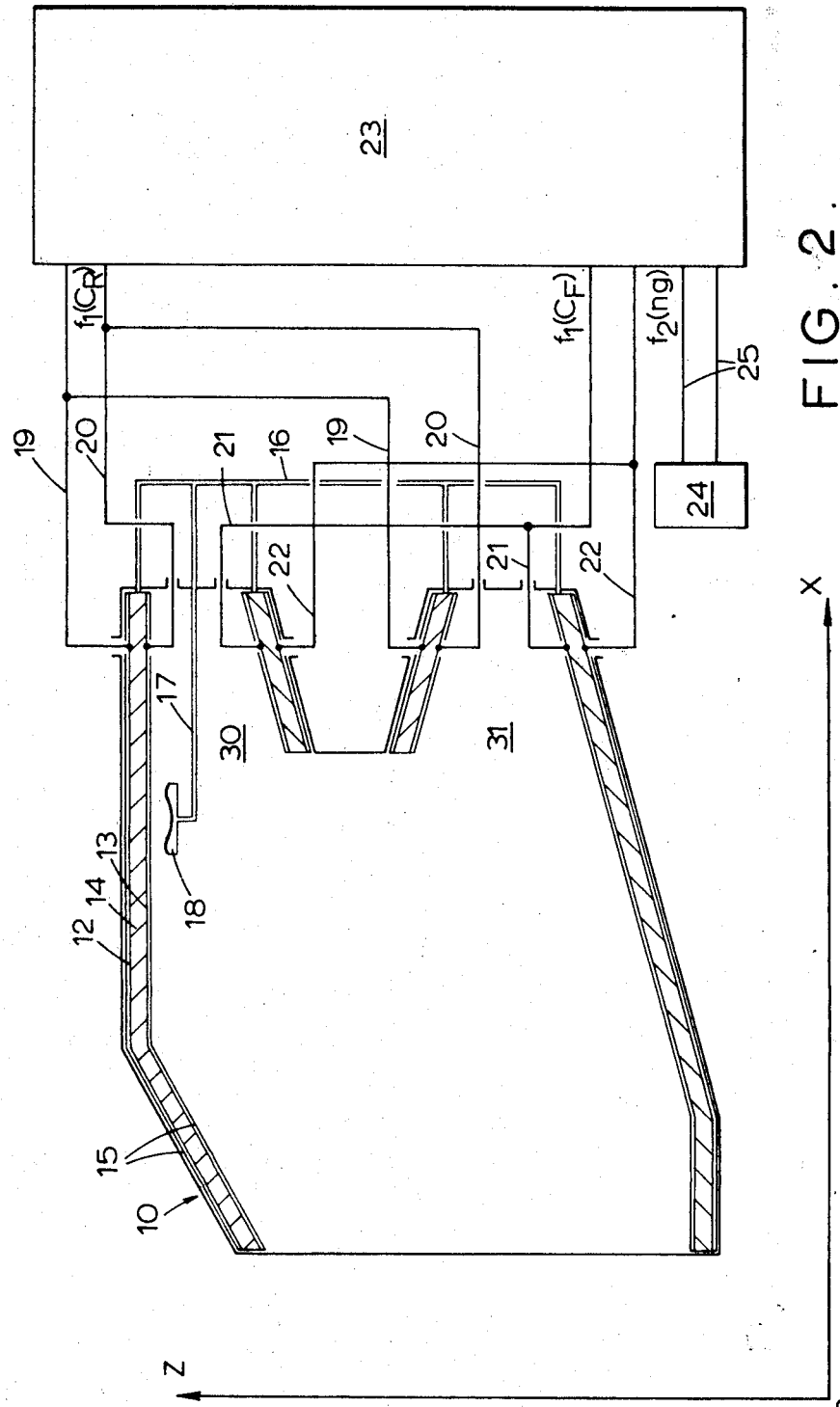

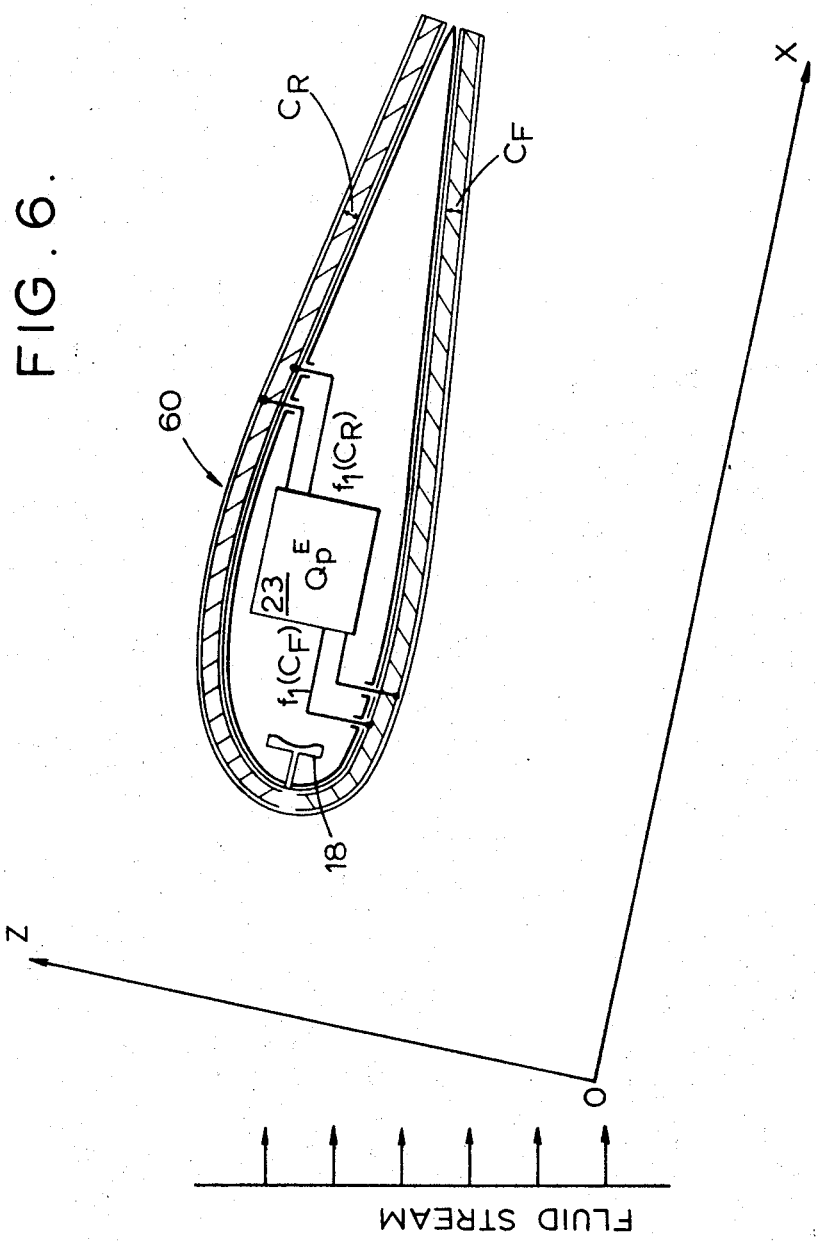

3,439,539
APPARATUS FOR MEASURING THE FORCE ON
A BODY DUE TO FLUID PRESSURE
Clare M. R. Pallis, Hilltop House, Warren Road,
Bluebell Hill, near Rochester, Kent, England
Filed Dec. 16, 1966, Ser. No. 602,193
Claims priority, application Great Britain, Dec. 16, 1965,
53,360/65; Mar. 8, 1966, 10,002/66
Int. Cl. G01f 3/18
U.S. Cl. 73—301                                    10 Claims

ABSTRACT OF THE DISCLOSURE

An arbitrarily-shaped fluid container has capacitors on the roof and/or floor thereof each in the form of two electrodes separated by an insulating elastomeric material such as rubber. The electrodes are bonded to each side of the elastomeric material and wholly enclosed in a thin flexible film of insulating material impervious to the fluid in container. The capacitors are electrically connected to a computer mechanism which effects an output indicative of the mass of the quantity of fluid in said container.

---

This invention relates to apparatus for measuring the component of force in a selected direction on a body due to variable fluid pressure(s) acting on the body.

One application of apparatus according to the present invention is in gauging the weight of liquid in a container, such as, for example, the weight of fuel in a fuel tank. A further application of the invention is to measure the force on an object in a moving fluid stream, such as an airfoil.

According to one aspect of the present invention there is provided apparatus for measuring the component of force in a selected direction on a body due to variable fluid pressure(s) acting on a selected area of the surface of the body, including capacitive means extending over at least a proportion of that part or parts of said area which at each point has a perpendicular having a component of selected sign in the selected direction, said capacitive means being adapted so that the separation of its electrodes at each point is dependent on the fluid pressure in the locality of that point and so that equal increments in said component of force causes substantially equal increments in the total capacitance of said capacitive means, and means for deriving a signal representative of the total capacitance of said capacitive means, whereby said signal embodies a measure of said component of force in the selected direction.

According to another aspect of this invention there is provided apparatus for measuring the component of force in a selected direction on a body due to variable fluid pressure(s) acting on a selected area of the surface of the body, comprising first and second capacitive means extending respectively over at least proportions of those parts of said selected area which at each point have perpendiculars having respectively a positive and a negative component in the selected direction, each said capacitive means being adapted so that the separation of its electrodes at each point is dependent on the fluid pressure in the locality of that point and so that equal increments in said component of force cause substantially equal increments in the total capacitance of each said capacitive means, first means and second means for respectively deriving first and second signals representative of the total capacitances of said first and second capacitive means, and means for generating a signal representative of the difference between said first and second signals, whereby the difference signal embodies a measure of said component of force in the selected direction.

Further features of this invention will appear from the following description of various embodiments thereof, presented by way of example only, together with a discussion of the principles upon which the invention depends. References will be made to the accompanying drawings in which:

FIGURE 2 is a schematic diagram, partly in section, of a second embodiment of apparatus for measuring the mass of liquid in a container.

FIGURE 6 is a schematic diagram of apparatus according to the invention for measuring the force on an airfoil.

Figure 1:
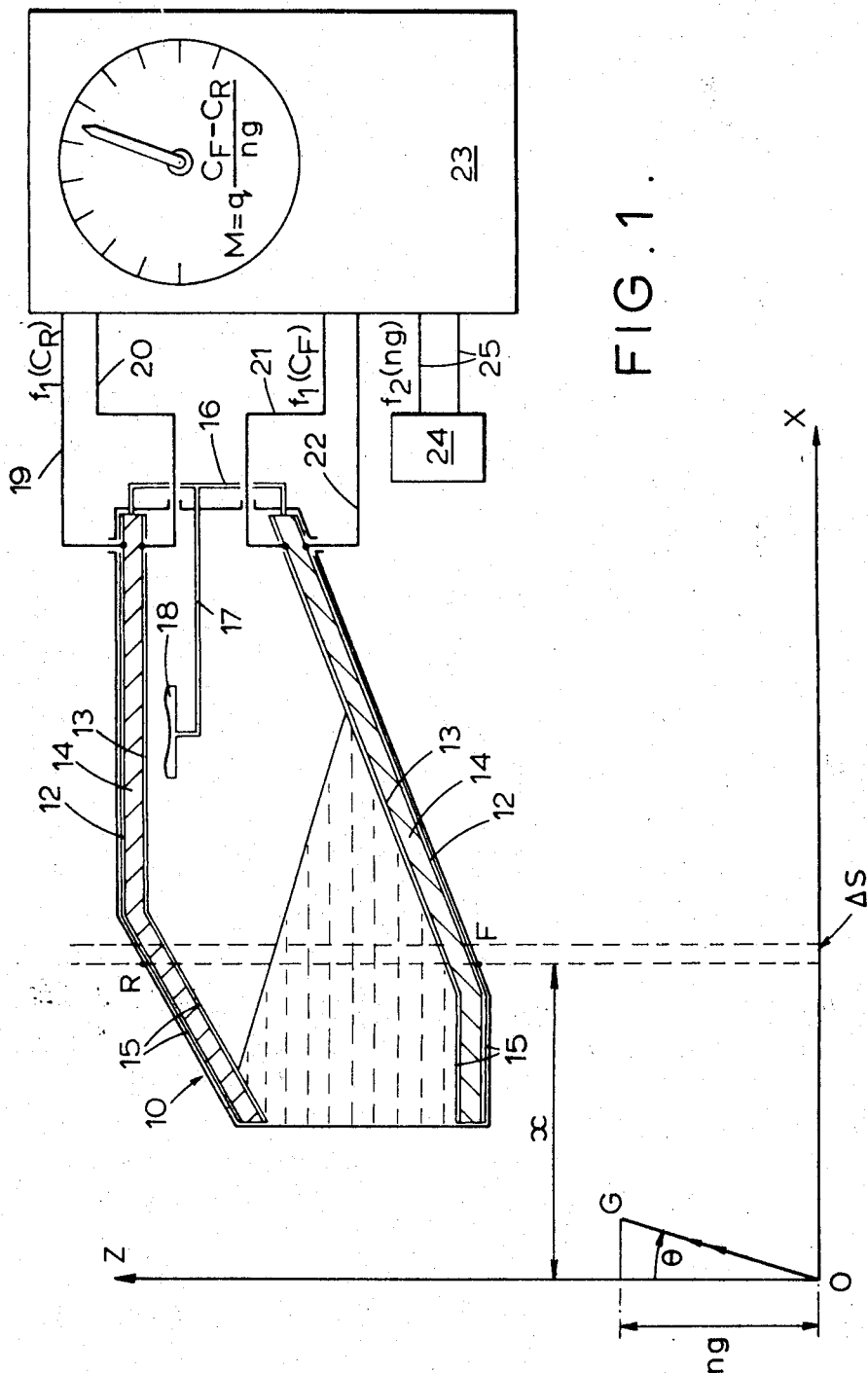
FIGURE 1 is a schematic diagram, partly in section, of apparatus according to the invention for measuring the mass of liquid in a container.

The principles upon which the invention is based will first be explained with reference to FIGURE 1. FIGURE 1 shows a section of an arbitrarily-shaped-three-dimensional fluid container 10 in the plane containing lines OZ and OG. O and OZ are respectively a datum point and a datum axis, both arbitrarily fixed relative to the container.

OG is the net acceleration vector to which the container is considered to be uniformly subjected. By "net acceleration" is meant acceleration referenced to zero which is defined by a condition of weightlessness or free fall. For example, for a static container on the earth's surface, the direction of OG would be vertically upwards and its magnitude would be that of the acceleration due to gravity. $ng$ is the magnitude of the component of OG in the direction OZ.

OX is the direction of a perpendicular to OZ through O in the plane of ZOG. $x$ is the component of distance from OZ in direction OX of any point in the container. OY not shown is a perpendicular through O to both OX and OZ. S is any area measured in plane XOY.

The principle of operation of the apparatus is as follows. The fluid pressure at any point on the floor or roof of the container affects the amount of compression of the resilient matrix 14 in the immediate vicinity of that point. Hence the corresponding separation of the electrodes 12 and 13 and thus the local value of condenser capacitance per unit area of electrode is affected in proportion. It will be proved that, provided certain design features are adhered to, the difference between the capacitances of the floor condenser $C_F$ and the roof condenser $C_R$ is proportional to the integral of floor pressure $P_F$ minus roof pressure $P_R$, with respect to area S in the plane XOY.

This integral will next be proved to be proportional also to the product of the mass M of liquid in the container multiplied by the magnitude $ng$ of the component of acceleration in the direction OZ.

It will then follow that the output $\{[q(C_F-C_R)]/(ng)\}$ which computer 23 is adapted to produce, is proportional to the quotient of $(Mng)$ divided by $(ng)$. This output will thus simply be proportional to M, so that, by a proper choice of the constant $q$, the computer output can be made equal the liquid mass contents of the container.

To prove the theory, it is convenient to introduce the following further symbols:

$f_1(C_F)$ and $f_1(C_R)$ are known functions of the capacitances $C_F$ and $C_R$.

$P_F$, $P_R$ and $P'_V$ are the absolute fluid pressures acting at points F and R and in vent pipe 16, respectively.

$f_2(ng)$ is a known function of $(ng)$ and constitutes the output of transducer 24.

Computer 23 has electrical inputs proportional to $f_1(C_R)$ and $f_1(C_F)$ and an electrical or other input proportional to $f_2(ng)$.

M is the mass of liquid and of any foam in container 10.

F is an arbitrary container floor point. The floor is defined as any part of the container's inner boundary surface where the perpendicular to that surface towards the inside of the container has a positive component in the direction OZ.

R is a container roof point, at the intersection with the roof of a line drawn through F in direction OZ. The roof is defined as any part of the container's inner boundary surface where the perpendicular to that surface towards the inside of the container has a negative component in the direction OZ.

The roof and floor of the container 10 are lined, respectively, with first and second capacitive means. The capacitive means are similar in construction and each comprises a pair of sheet electrodes 12 and 13 spaced apart by a layer of insulating dielectric 14. The electrodes 12 and 13 are formed of thin, flexible and electrically conductive material such as metallic foil. Each layer 14 is a thin matrix of electrically insulating elastomeric material such as rubber. Electrodes 12 and 13 are bonded one to each side of layer 14. Each capacitive means is wholly enclosed in a thin flexible film 15 of electrically insulating material impervious to the fluid in the container.

A vent pipe 16 communicates with the air spaces defined with the two matrices 14 and sealed in by films 15. The vent pipe 16 communicates with pipe 17 which terminates at a device 18 located within the container. Device 18 is suitably a substantially zero-stiffness diaphragm or bladder or other device which prevents fluid entering pipe 17, yet ensures that the air pressure in pipe 17 is substantially the same as the pressure of the fluid in the vicinity of the device 18.

Leads 19 and 20 extend from the electrodes of the roof capacitive means and leads 21 and 22 extend from the electrodes of the floor capacitive means. These leads 19–22 run externally of the container to a computer 23. An acceleration-measuring transducer 24 has leads 25 connected to the computer 23.

$S_{TOT}$ is the area of the container floor's projection in direction ZO onto plane XOY. (N.B. for a fully closed container, this is equal to the area of the container roof's similar projection.)

$\Delta S$ is an increment of area in plane XOY.

$\Delta S_{BF}$, $\Delta S_{BR}$ are the increments in boundary area rising from the projection of $\Delta S$ in direction OZ onto the container floor and roof, respectively. (It will be seen that the value of $(\Delta S_{BF}/\Delta S)$ or of $(\Delta S_{BR}/\Delta S)$ is determined for each floor or roof point as applicable by the inclination relative to plane XOY of the container boundary's local tangent plane.)

$\Delta S_{LF}$, $\Delta S_{LR}$ are the contributions to electrode areas arising from the projection of $\Delta S$ in the direction OZ onto an electrode of $C_F$ and of $C_R$ respectively. (It will be seen that the value of $(\Delta S_{LF}/\Delta S_{BF})$ or of $(\Delta S_{LR}/\Delta S_{BR})$ is determined in the vicinity of each container floor or roof point as applicable, by the extent to which the electrodes may have been locally pierced by numerous small closely-pitched holes or slots which effectively reduce the local ratio of electrode area to corresponding boundary area.)

$\Delta C_F$, $\Delta C_R$ are the contributions to the capacitances of $C_F$ and $C_R$, respectively, arising from electrode areas $\Delta S_{LF}$ and $\Delta S_{LR}$, respectively, under absolute pressures $P_F$, $P'_V$, and $P_R$, $P'_V$ respectively.

$k_F$, $k_R$ are the dielectric constants of the condenser matrices 14 at any floor point F and any roof point R, respectively. $k_F$ and $k_R$ may each independently be allowed to vary with position, so long as a certain parameter involving them is kept constant, as will be explained later.

$t_{FO}$, $t_{RO}$ are the thicknesses of matrices 14 at any floor point F and any roof point R, respectively, when pressures $P_F$, $P_R$, and $P'_V$ are all three equal to absolute zero. $t_{FO}$ and $t_{RO}$ may each independently be allowed to vary with position, so long as a certain parameter involving them is kept constant, as will be explained later.

$t_{FP}$, $t_{RP}$ are the thicknesses of matrices 14 at any floor point F and any roof point R, respectively, under absolute pressures $P_F$ and $P_R$, respectively, and given an interelectrode pressure $P'_V$.

$u$ defines the relative sensitivities of a matrix to absolute pressure and to pressure-difference. $u$ is the ratio of the compressive strain that would be produced in a matrix under conditions of zero pressure-difference by a small increment above zero in the absolute pressures $(P_F=P'_V=P_R=\delta P)$, divided by the compressive strain that would be produced under conditions of absolute zero interelectrode pressure $(P'_V=0)$ by a small increment in external pressure only $(P_F=\delta P$ or $P_R=\delta P)$. It will be seen that a completely solid matrix would have a $u$ value of unity, while a matrix in which the solid matter occupied only a small proportion of the interelectrode space would have a $u$ value only slightly greater than zero.

$E'$ is the constant ratio, under conditions of absolute zero interelectrode pressure $(P'_V=0)$, of a small increment in external pressure $(P_F=\delta P$ or $P_R=\delta P)$ divided by matrix compressive strain. $E'$ is thus in the nature of an effective modulus of elasticity. The ratio, under conditions of zero pressure-difference, of a small increment above zero in the absolute pressures $(P_F=P'_V=P_R=\delta P)$ divided by compressive strain will, by definition of $u$, then be $(E'/u)$. For very small deflections $(t_{FP}-t_{FO})$ only, the value of $E'$ is thus defined by the formula $$t_{FP}=t_{FO}\{1-[(P_F-P'_V+uP'_V)/E']\}$$

If however $(P_F-P'_V+uP'_V)$ were so large as to exceed $E'$ this formula would make $t_{FP}$ negative, which would be absurd. The values of $$[\delta(t_{FP}/t_{FO})/\delta P_F]\,(=-1/E')$$

and of $$[\delta(t_{FP}/t_{FO})/\delta P'_V]\,(=(1-u)/E')$$

given by the above definition of $E'$ are given also, for $P_F$ and $P'_V$ equal to zero, by the alternative formula:

$$t_{FP}=t_{FO}\{1-[(P_F-P'_V+uP'_V)/(E'+P_F-P'_V+uP'_V)]\}$$

According to the latter formula, however, as $(P_F-P'_V+uP'_V)$ approaches infinity, $t_{FP}$ asymptotically approaches zero. Common sense indicates this to be the right trend. The formula used to define the mechanical behaviour of the matrices in compression as well as the constant $E'$ over a realistic working pressure range for the apparatus, will therefore be taken as:

$$t_{FP}=t_{FO}\{1-[(P_F-P'_V+uP'_V)/(E'+P_F-P'_V+uP'_V)]\}$$

$\Delta M$ is the mass of fluid in the incremental prism of cross-section $\Delta S$ contained between floor boundary increment $\Delta S_{BF}$ and roof boundary increment $\Delta S_{BR}$.

The proof previously referred to now follows. From basic electrical condenser theory:

$$\Delta C_F = (k_F \Delta S_{LF})/t_{FP} \qquad (1)$$

But by definition of $E'$:

$$t_{FP} = t_{FO}\{1 - [(P_F - P'_V + uP'_V)/(E' + P_F - P'_V + uP'_V)]\}$$

Therefore:

$$t_{FP} = (t_{FO} E')/(E' + P_F - P'_V + uP'_V) \qquad (2)$$

Combining Equations 1 and 2:

$$\Delta C_F = [(k_F \Delta S_{LF})/t_{FO}]\{1 + [(P_F - P'_V + uP'_V)/E']\}$$

Therefore:

$$\Delta C_F = \{[k_F(\Delta S_{LF}/\Delta S_{BF})(\Delta S_{BF}/\Delta S)\Delta S]/t_{FO}\}$$
$$\{1 + [(P_F - P'_V + uP'_V)/E']\} \qquad (3)$$

It was seen that the quantity $(\Delta S_{BF}/\Delta S)$ is determined by the slope of the floor surface relative to plane XOY, and can vary from point to point over the container floor. It is, however a design requirement of the system that the parameter $$\{[k_F(\Delta S_{LF}/\Delta S_{BF})(\Delta S_{BF}/\Delta S)]/t_{FO}\}$$

be a constant. Any variation in $(\Delta S_{BF}/\Delta S)$ due to varying floor gradient must thus be compensated by changes in one or any combination of the other terms, viz $k_F$, $(\Delta S_{LF}/\Delta S_{BF})$ and $t_{FO}$. As an example, $k_F$ and $t_{FO}$ can both be kept constant while the electrode plates are punched with numerous small holes or slots, of size and pitch such that the local ratio of remaining metal area divided by container floor area straddled is equal to the desired value of $(\Delta S_{LF}/\Delta S_{BF})$. Where the floor surface is parallel to plane XOY, it may be convenient, though it is not essential, to make $(\Delta S_{LF}/\Delta S_{BF})$ equal to unity.

Let N be a constant defined by:

$$N = [k_F(\Delta S_{LF}/\Delta S_{BF})(\Delta S_{BF}/\Delta S)]/t_{FO} \qquad (4)$$

Combining equations 3 and 4:

$$\Delta C_F = N\{1 + [(P_F - P'_V + uP'_V)/E']\}\Delta S \qquad (5)$$

Similarly, considering the roof condenser, let:

$$N = [k_R(\Delta S_{LR}/\Delta S_{BR})(\Delta S_{BR}/\Delta S)]/t_{RO} \qquad (6)$$

so that, by similarly with Equation 5:

$$\Delta C_R = N\{1 + [(P_R - P'_V + uP'_V)/E']\}\Delta S \qquad (7)$$

Combining Equations 5 and 7:

$$\Delta C_F - \Delta C_R = (N/E')(P_F - P_R)\Delta S$$

Therefore:

$$C_F - C_R = (N/E') \int_0^{S_{TOT}} (P_F - P_R) dS \qquad (8)$$

Applying Newton's Second Law to the motion in direction OZ of any increment of fluid mass $\Delta M$ in the container:

$$(P_F - P_R)\Delta S = \Delta M n g \qquad (9)$$

Referring to FIGURE 1, it will be seen that Equation 9 is true irrespective of whether, at the location considered, both floor and roof are wetted, or the floor is wetted and the roof is dry, or vice-versa, or both floor and roof are dry. Equation 9 does not require constancy in density of the fluid which may thus be a stratified mixture of liquids and foam.

From Equation 9:

$$M = (1/ng) \int_0^{S_{TOT}} (P_F - P_R) dS \qquad (10)$$

Combining Equations 8 and 10:

$$M = (E'/N)[(C_F - C_R)/(ng)] \qquad (11)$$

Let $$q = E'/N \qquad (12)$$

Then, simplifying Equations 4, 6 and combining them with Equation 12:

$$q = E'[t_{FO}/(k_F \Delta S_{LF}/\Delta S)]$$
$$= E'[t_{RO}/(k_R \Delta S_{LR}/\Delta S)] \qquad (13)$$

It will be remembered, from the introduction to Equations 4 and 6, that the two expressions in square brackets in Equation 13 are equal to each other and constant. $E'$ is also a constant. $q$ is therefore constant.

Combining Equations 11 and 12:

$$M = q[(C_F - C_R)/(ng)] \qquad (14)$$

where $q$ is a parameter defined by Equation 13 and required, in the design of the floor and roof condensers, to be kept equal and constant for all floor and roof points.

Irregularities in container shape can result in the floor and roof each being split up into a number of overlapping areas as illustrated by way of example in FIG. 2, where the section of the container is shown to include recesses 30 and 31. The previously described theory is then still applicable provided that all portions of the floor condenser are electrically connected in parallel to one another, and that all portions of the roof condenser are electrically connected in parallel to one another and that all condenser matrices are vented to a common pressure. This also is illustrated in FIG. 2, in which, except for the extra features just mentioned, the same references are used as in FIG. 1 for similar parts and values.

Figure 3:
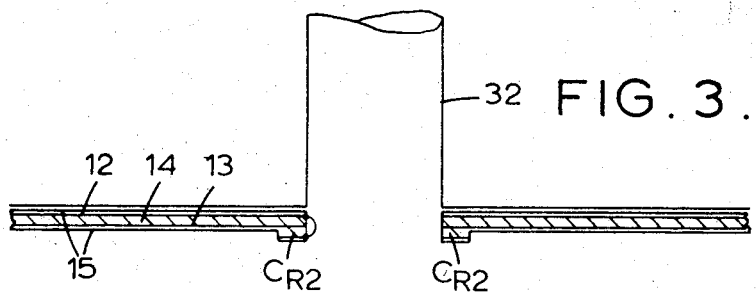
FIGURE 3 is a detail showing the distribution of the capacitive means where a pipe leads into the container shown in FIGURE 1 or 2.

In the event of particular areas of the container boundary not being suitable for lining with a pressure sensing condenser element (as illustrated by way of example in FIG. 3 where the connection of a filling pipe 32 to the container roof section means that the pipe's internal cross section effectively constitutes a portion of the container roof) the previously described theory can still be made applicable to a close order of approximation by the following device. In the immediate vicinity of the container boundary area which is not suitable for lining with a pressure-sensing condenser, a small area of the surrounding pressure-sensing condenser has its effectiveness increased to compensate for the adjacent missing area of pressure-sensing condenser. Referring to Equation 6 this can be done by an appropriate change in nominal matrix thickness $t_{RO}$, in dielectric constant $k_R$, or in $(\Delta S_{LR}/\Delta S)$ or by combination of all three. In the example illustrated in FIG. 3, the compensation is effected by an annulus of pressure-sensing condenser $C_{R2}$ surrounding the pipe connection, which effectively doubles $(\Delta S_{LR}/\Delta S)$ over an area equal to the pipe's internal cross sectional area.

It is possible to dispense with the vent-pipe 16, pipe 17 and the device 18, if the matrices 14 are made of solid sheet, giving a $u$ value of unity. Examination of the previous equations reveals, however, that the penalty of this simplification results in increased susceptibility to system error if there is in practice any slight difference between the values of $E'$ for the floor and for the roof (e.g. due to a temperature difference between the two parts) and if $P_F$ and/or $P_R$ is large compared to $(P_F - P_R)$. Moreover, the assumption of constancy in $k_F$ and in $k_R$ at any given locations may then become inaccurate under conditions of significant strain, owing to change in net matrix density.

In deriving Equation 14, it was assumed that $E'$ is a constant. In a practical application, any variation in $E'$ due to change in container temperature, can be compensated for by introducing an appropriate corrective function of container temperature into the computation of M.

If it is further desired to compensate for different variations in the values of $E'$ for the floor and for the roof condensers, it is possible to introduce appropriate corrective functions of a representative floor temperature and of a representative roof temperature, into the computation of M.

A combination of the features hitherto described presents a general application of the invention. Not all the features, even of FIG. 1, are, however, necessary for the invention to apply, and simplified, numbered cases are now considered. The previously defined symbols are again used, but with the relevant number subscript to identify the terms in each special equation.

Case 1 relates to a container in which wetting of the roof will not occur or will have effects which can be neglected. It is possible, in this case, to replace the roof-pressure-sensing condenser either by a transducer sensing the pressure which acts on the free surface of the liquid, or by a device which can be manually set according to the pressure which is known to act on the free surface of the liquid. In the event of this pressure being constant, provision for simulating the input $f_1(C_R)$ can effectively be built into the computer 23, of FIG. 1.

Case 2 relates to a container subjected to a net acceleration $OG_2$ (FIG. 1) which does not vary in its known magnitude. If the container can nevertheless be tilted, the component of acceleration $(ng)_2$ in direction OZ, will be seen from FIG. 1 to be determined by the angle of tilt $\theta_2$ between $OG_2$ and OZ, according to the formula:

$$(ng)_2 = |OG_2| \cos \theta_2$$

where $|OG_2|$ is the magnitude of vector $OG_2$.

The transducer $T_2$ can then take the simple form of a device for measuring or manually setting the angle $\theta_2$.

This would apply for instance, to a static container near the earth's surface, where $|OG_2|$ is equal to $g$, so that:

$$(ng)_2 = g \cos \theta_2$$

In this application, Equation 14 becomes:

$$M_2 = (q/g)[(C_F - C_R)/\cos \theta_2] \quad (15)$$

A measure of the fluid weight as opposed to the fluid mass can then be given, if desired, by the expression at the right of the equal sign in Equation 15 but with the term $g$ replaced by unity.

Cases 1 and 2 may apply simultaneously in practice.

Case 3 relates to a container subjected to a net acceleration $OG_3$ (FIG. 1) which does not vary in its known magnitude and direction. The transducer 24 can, in this case, be dispensed with altogether. This would apply, for instance, to a container which cannot vary its tilt and which rests on the earth's surface. Provision for constant generation of $(ng)_3 (=g \cos \theta_3)$ can then be built into the computer 23, so that Equation 14 becomes:

$$M_3 = [q/(g \cos \theta_3)](C_F - C_R) \quad (16)$$

A measure of the fluid weight, as opposed to fluid mass, can here be given, if desired, by the expression at the right hand side of the equal sign in Equation 16 but with the term $g$ replaced by unity.

Cases 1 and 3 may apply simultaneously in practice.

Figure 4:
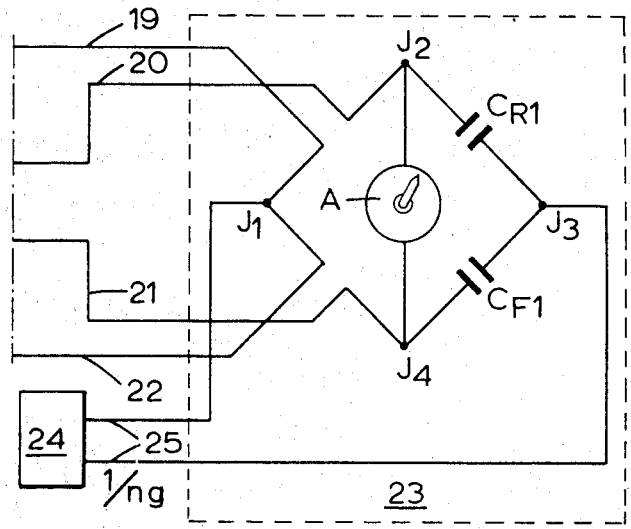
FIGURE 4 is a schematic diagram showing the computing circuit of FIGURE 1 in more detail.

FIG. 4 illustrates, by way of example, an electrical circuit for carrying out the computation described in the explanation of FIG. 1. In the embodiment of FIG. 4, the same references are used as in FIG. 1 for similar parts and values, but in addition:

$J_1J_2J_3J_4$ is an electrical capacitance bridge circuit energised by the output $f_2(ng)$ of transducer T which is connected across points $J_1$ and $J_3$ and which takes the form of an alternating voltage $V_T$, where $$V_T = [K_T/(ng)] \quad (17)$$

$K_T$ being a constant.

A is a device for measuring the alternating voltage $V_A$, where $V_A$ is the voltage across bridge points $J_2$ and $J_4$.

$C_{F1}$, $C_{R1}$ are condensers of constant and equal capacitance $$bC_{\overline{FR}}$$

where $b$ is a constant, and $$C_{\overline{FR}}$$

is the average capacitance of the floor and roof condensers under the conditions for which maximum accuracy is desired from the system.

From electrical bridge theory which is outside the scope of the present invention, it can be shown that, for the circuit described and provided that the transducer 24 and the voltmeter A, respectively, have virtually zero and virtually infinite impedance.

$$V_A/V_T = (C_F - C_R)/a \quad (18)$$

where $a$ is virtually a constant, equal to $$[(b+1)^2/b]C_{\overline{FR}}$$

provided that $b$ is much greater than unity and that $$(C_F - C_{\overline{FR}})$$

and $$(C_R - C_{\overline{FR}})$$

are both small compared to $$C_{\overline{FR}}$$

Then, combining Equations 14, 17 and 18

$$M = [(aq)/K_T]V_A \quad (19)$$

where $[(aq)/K_T]$ is virtually constant.

The voltmeter A can thus be graduated to read directly in mass units.

It is possible, if desired, to replace the thin impervious films 15 enclosing $C_F$ and $C_R$ respectively by a single flexible bag-tank within the main rigid tank. This flexible bag-tank then allows fluid pressure to be transmitted across its thickness virtually unaltered, to act on the electrodes while keeping the electrodes from actual contact with the fluid.

Using the impervious films 15 as illustrated in FIG. 1, it is a matter of choice whether or not the fluid is allowed to permeate into the narrow spaces between the tank boundary proper and the films. If the fluid is allowed so to permeate, then the undesirable electrical effects of any electrical conductivity which the fluid may possess may be minimized by forming each affected pressure-sensing condenser from three instead of two metallic plates, of which the outer two are electrically connected to each other and constitute the first electrode, while the inner one constitutes the second electrode.

The constraint on how close together the electrodes are brought by the excess of tank pressures $P_F$ or $P_R$ over vent pressure $P'_V$ has hitherto been considered to be provided by compressive stresses in the matrices 14. It is, however, equally possible for this constraint to be provided by stresses in the electrodes themselves, which would then be supported by one or more spaced-out rigid and relatively inflexible insulating separators, between which these electrodes would be allowed to bow in under pressure, in a series of waves. The constraint can alternatively be provided by a series of electrically conductive springs provided that electrically insulating pads are inserted as necessary to prevent such springs from providing electrical short-circuits between the electrodes.

It is possible, for economy and convenience in installation, to line only a certain proportion instead of the entirety of the container's floor and roof with capacitive means. Provided that the electrical signals arising from each such capacitive means are appropriately interpreted as to scale, the invention is then still applicable although there is no longer strictly a continuous integral of pressure with respect to area but rather a summation of separate integrals, each representing an imaginary prismatic portion of the tank.

In one embodiment of the apparatus in which only a proportion of the surface is lined with capacitive means, no capacative means are provided on the roof and the floor is provided with a plurality of elongated, strip-like condensers. In a simple case, the condensers extend parallel to each other and are regularly spaced across the floor. The capacitances of the condensers are summed by connecting the condensers in parallel by coaxial cables external of the container. This form of the invention can still yield good results if the container can tilt about an axis perpendicular to the lines of the condensers. For rotation about an axis parallel to the lines of the condensers, the computation may be in error to a small extent. This error may be reduced to any desired extent by increasing the proportion of the floor that is covered with condensers.

Figure 5:
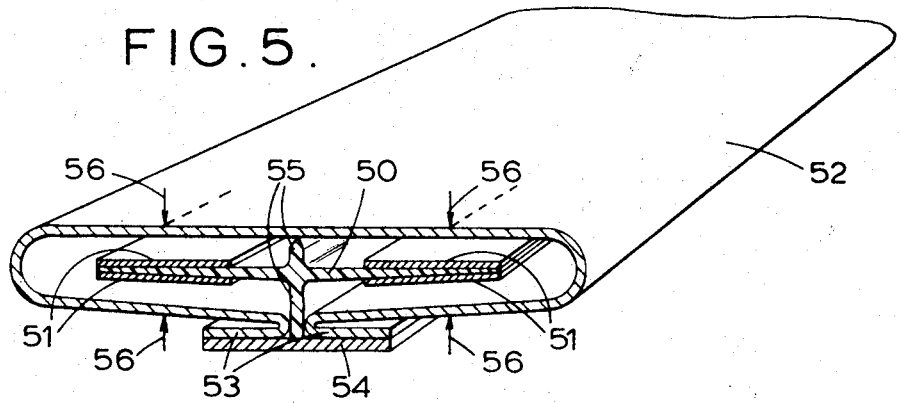
FIGURE 5 is a perspective view of capacitive means for use in apparatus according to the invention.

One form of elongated condenser is shown in FIGURE 5. The condenser comprises a cruciform section backbone 50 formed of rigid electrically insulating material. The backbone 50 carries four metallic films 51 one above and one below each side flange. These four films 51 are connected in parallel and constitute one electrode of the condenser. The other electrode of the condenser comprises a resilient metal sheet 52 formed to surround the backbone and first electrode in the shape of a flattened tube.

The edges of the sheet 52 are bent outwardly back on themselves at 53 and are secured to a strip sole plate 54 of insulating material which in turn is secured to the floor of the container. The walls of the flattened tube are held apart centrally by the shorter flanges 55 of the backbone 50 engaged between the central line of sheet 52 and the central line of sole plate 54 between the bent back ends of sheet 52. When fluid under pressure acts on the condenser the sheet 52 bows inwardly about each of four antinodal lines indicated by arrows 56.

Although the applications of the proposed method hitherto described have all involved the integration of pressures acting inside a container and, hence, the component in a particular direction of the net force on the container due to these internal pressures, the method will readily be seen to be equally applicable to the integration of pressures acting on the outside of a solid body and, hence, to the determination of the component in a particular direction of the net force on the body due to these external pressures. The latter application is illustrated in FIG. 6.

FIGURE 6 shows, by way of example, the section of an aircraft wing 60 in a fluid stream. The floor and roof of the aerofoil are, in this case, externally lined with the pressure-sensing condensers $C_F$ and $C_R$, respectively.

The component $p$ of aerodynamic force on the aerofoil in direction OZ (which from elementary hydrostatics is equal to $$\int_0^S TOT(P_F - P_R)ds\Big)$$

then derives directly from Equation 8, so that:

$$p = (E'/N)(C_F - C_R)$$

The computer $Q_P$ has this expression as its output.

In the following claims the word fluid is to be interpreted as including powdered, granulated or other particulate solid matter, the action of which, on the body, may contribute to or be the sole cause of the pressure(s) acting on the body. For example, apparatus constructed within the scope of claim 1 may be employed for weighing particulate matter such as sugar, flour or grain resting on a warehouse floor, or for weighing coal in a storage yard.

Having thus described the invention, what is claimed as novel and desired to be secured by Letters Patent of the United States is:

1. In a system for gauging the quantity of liquid stored in a substantially rigid container having a floor, comprising:
    (a) capacitive means extending over at least part of said floor;
    (b) said capacitive means comprising first and second closely spaced apart electrode means and a dielectric medium interposed between said two electrode means;
    (c) sealing means preventing said liquid entering between said two electrode means;
    (d) at least one of said electrode means being resiliently mounted so as to move closer to and further apart from the other of said electrode means responsive, respectively, to increases and decreases in the total liquid pressures effective on said capacitive means;
    (e) said resiliently mounted electrode means being formed of thin flexible electrically conductive material whereby said resiliently mounted electrode means moves at each locality thereof closer to and further apart from said other electrode means responsive, respectively, to local increases and local decreases in said liquid pressures effective on said capacitive means substantially without affecting the electrode separation at points remote from said locality;
    (f) said capacitive means being constructed in relation to said floor according to the requirement that a parameter K is substantially constant over the entire capacitive means when the container is empty of said liquid;
    (g) where $K = \{[k_F(\Delta S_{LF}/\Delta S_{BF})(\Delta S_{BF}/\Delta S)]/t_{FO}\}$;
    (h) wherein $k_F$ is the dielectric constant of said interposed dielectric medium at any point F,
        $t_{FO}$ is the thickness of said interposed medium adjacent to point F,
        $\Delta S$ is a relatively small area in a horizontal datum plane,
        $\Delta S_{LF}$ is that small area of said capacitive means surrounding point F obtained by projecting $\Delta S$ perpendicular to said datum plane onto said capacitive means,
        $\Delta S_{BF}$ is that small area of said floor surrounding point F obtained by projection $\Delta S$ perpendicular to said datum plane onto said floor;
    (i) whereby the total capacitance of said capacitive means is dependent on the quantity of liquid in said container substantially regardless of the distribution of said liquid pressures.

2. A system according to claim 1 further comprising insulating means rigidly supporting said resiliently mounted electrode means at spaced intervals, at least one of said electrode means being comprised of resiliently flexible sheet metal, with the inherent resilience of said metal sheet adjacent said insulating supporting means providing the resilient mounting for said at least one of said electrode means.

3. A system according to claim 1 wherein said resiliently mounted electrode means substantially completely surrounds said other electrode means.

4. A system according to claim 1 wherein solid compressible material is disposed between said electrode means, said material resiliently mounting said resiliently mounted electrode means.

5. In a system for gauging the quantity of liquid stored in a substantially rigid container means having a floor, comprising:
    (a) at least one capacitive-type integrating pressure transducer extending over at least part of said floor;
    (b) means securing said transducer relative to said floor;
    (c) said transducer comprising a narrow elongated flattened outer shell portion defining a narrow elongated cavity therein;
    (d) a source of reference pressure and means venting said cavity to said source;
    (e) at least one lengthwise strip of said shell portion being formed of conductive resiliently flexible sheet metal and constituting a first electrode means, said first electrode means having a surface facing inwardly of said shell portion cavity;
    (f) second narrow elongate electrode means mounted in spaced apart opposed relation to and aligned lengthwise with said inwardly facing surface of said first electrode means, said first and second electrode means constituting the plates of a capacitor;
    (g) means substantially rigidly supporting said strip of resilient metal which constitutes said first electrode means along at least one line lengthwise of said shell portion whereby at each locality thereof said first electrode means bows substantially at right angles to said supporting line inwardly towards and outwardly away from said second electrode means responsive, respectively, to local increases and local decreases in the liquid pressures effective on said transducer, substantially without affecting the electrode separation at points remote from said locality, the extent of said bowing being determined substantially solely by the local balance between, on the one hand, the excess of the liquid pressures over said reference pressure and, on the other hand, the elastic bending strains in said first electrode means, whereby the total capacitance of said capacitor is dependent on the quantity of liquids in said containing means.

6. A system according to claim 5 including at least one elongate insulating backbone member locally supporting said second narrow elongate electrode means rigidly relative to said first narrow elongate electrode means.

7. A system according to claim 5 wherein a plurality of said transducers are provided substantially parallel to one another and substantially regularly spaced over said floor, and electrical leads connecting the respective capacitors of said transducers in parallel.

8. A system according to claim 5 wherein said containing means additionally has a roof and including said at least one capacitive-type integrating pressure transducer extending over and secured relative to said roof, whereby the total capacitance of said roof capacitor is dependent on the total upward force exerted on said roof by said liquid and any air, gas and vapours present in said container, first means for deriving a first signal representative of the total capacitance of said floor capacitor, second means for deriving a second signal representative of the total capacitance of said roof capacitor, means for generating a signal representative of the difference between said first and second signals, and conductive leads electrically connecting said floor capacitor to said first means, said roof capacitor to said second means, and said first and second means, respectively, to said means for generating a difference signal whereby said difference signal is a corrected measure of said quantity of liquid.

9. A system according to claim 5 including means for deriving a signal representative of the total capacitance of said capacitor, means for generating a signal representative of the magnitude of the component in the vertical direction of the net acceleration to which the container is subject, computing means responsive to said capacitance signal and to said acceleration signal to compute a mass signal, and conductive leads electrically connecting said capacitor to said means for deriving a signal, and said means for deriving a signal and said means for generating a signal to said computing means, respectively, said mass signal being a measure of the mass of said quantity of liquid.

10. A system according to claim 5 including means for deriving a signal representative of the total capacitance of said capacitor, means for generating a signal representative of the angle at which the container is inclined relative to its position at which said floor is lowermost, correcting means responsive to said angle signal for correcting said capacitance signal to the value it would have if said angle were zero, and conductive leads electrically connecting said capacitor to said means for deriving a signal, and said means for deriving a signal and said means for generating a signal to said correcting means, respectively.

References Cited

UNITED STATES PATENTS

| | | | |
|---|---|---|---|
| 2,649,579 | 8/1953 | Alexander. | |
| 2,982,895 | 5/1961 | Exon | 317—246 |
| 3,148,314 | 9/1964 | Ponemon | 317—246 |
| 3,177,967 | 4/1965 | Wilson | 317—246 XR |
| 3,180,146 | 4/1965 | Hossack | 73—398 XR |
| 3,302,080 | 1/1967 | Dauger et al. | 317—246 |
| 3,328,653 | 6/1967 | Wolf | 317—246 |

LOUIS R. PRINCE, *Primary Examiner.*

DONALD O. WOODIEL, *Assistant Examiner.*

U.S. Cl. X.R.

317—246